United States Patent [19]  [11] 4,050,483
Bishop  [45] Sept. 27, 1977

[54] INFLATION SURGE DELAY

[75] Inventor: Robert J. Bishop, Rochester, Mich.

[73] Assignee: Allied Chemical Corporation, Morris Township, N.J.

[21] Appl. No.: 622,325

[22] Filed: Oct. 14, 1975

[51] Int. Cl.² .............................................. B65B 3/04
[52] U.S. Cl. ....................................... 141/4; 141/10; 141/197; 280/737
[58] Field of Search ...................... 141/1, 4, 313-317, 141/47, 49, 99, 54, 56, 63, 66, 114, 67, 10, 197; 280/735-742; 222/3, 5; 102/39

[56] References Cited

U.S. PATENT DOCUMENTS

| 3,413,013 | 11/1968 | Wissing et al. | 280/737 |
| 3,810,655 | 5/1974 | Prachar | 102/39 |
| 3,884,497 | 5/1975 | Massengill et al. | 280/737 |

Primary Examiner—Houston S. Bell, Jr.
Attorney, Agent, or Firm—Ernest D. Buff; John P. Kirby

[57] ABSTRACT

A method and apparatus for filling motor vehicle gas bags. The inflating gas flows to a manifold, about which a motor vehicle gas bag or bags are disposed, whereby the filling of gas bag (or bags) is delayed, it being filled first with gas filling a part of the manifold, and then with a greater quantity of gas filling the entire manifold upon the rupture of burst disc means.

6 Claims, 2 Drawing Figures

INFLATION SURGE DELAY

BACKGROUND OF THE INVENTION

A method and apparatus for filling motor vehicle gas bags. The inflating gas flows to a manifold, about which a motor vehicle gas bag or bags are disposed, whereby the filling of gas bag (or bags) is delayed, it being filled first with gas filling a part of the manifold, and then with a greater quantity of gas filling the entire manifold upon the rupture of burst disc means.

It has been proposed that inflatable gas bags be employed in motor vehicles and especially automobiles as a means for constraining passengers therein, to prevent serious injuries in the event that the vehicle is involved in an impact. The use of gas bags is suggested in addition to or as an alternative to seat belts which are presently employed. Although seat belts provide excellent protection against serious injury in automobile impacts, they suffer from the disadvantage that they are often not used.

It is proposed that a method be employed which would provide the protection of seat belts without requiring any voluntary act on the part of the motor vehicle driver or passenger. A method and apparatus which meets these requirements is a motor vehicle gas bag. A vehicle gas bag is actuated upon impact automatically. The vehicle gas bag is virtually instantaneously filled upon impact, constraining the automobile occupant in his seat during the critical moments following impact.

It has been found that by slowing down the filling of the gas bag, that is, by delaying at least a part of the filling, that protection may be had for what has become known as the standing child. Momentum is defined as the difference between the momentum of the inflating bag and the momentum of the occupant which, in turn, is proportional to the velocity of the vehicle. This is especially significant when the occupant is a child. The occupant's momentum, of course, is also directly proportional to the mass of the occupant. Thus, a small child, having small mass, has a relatively small momentum upon impact of a slow moving vehicle. If the bag inflates at too high a rate of velocity, serious injury to a small occupant may result. In this situation, a slowing down of the speed with which the bag inflates in the initial stages of inflation results in a safer disposition of the bag in the car. This is particularly useful in the case of a child standing in the right front passenger seat (a child standing on the floor in front of the dash panel).

SUMMARY OF THE INVENTION

The method and apparatus of the instant invention is directed to filling a gas bag or bags disposed on a vehicle.

When a vehicle equipped with an embodiment of the instant invention is involved in an impact, in one embodiment, a signal is sent from a sensor to gas supply apparatus. Gas is then supplied from gas bag supply apparatus through a manifold to inflate a restraining bag. The surge of gas is limited initially, at least for example for a time (until the child begins to be moved by the bag), reducing these loads.

Generally, the invention is directed to the restricting of the flow path in the manifold with burst disc means so that lesser quantity of gas is supplied to the bag until pressure of gas in the manifold breaks the disc means, after which breaking large quantities of gas are supplied through the entire manifold.

In a specific embodiment of the invention, gas flowing out of the manifold is limited by use of a burst disc mounted therein to a small area of the transverse passage until the gas pressure in the inner tube blocked off by the disc reaches a pressure sufficient to break the disc. Thereafter, full flow is achieved through the inner tube of the manifold and the air cushion.

BRIEF DESCRIPTION OF THE DRAWING

The instant invention may be better understood by reference to the accompanying drawings, of which.

DETAILED DESCRIPTION OF THE INVENTION

Figure 1:
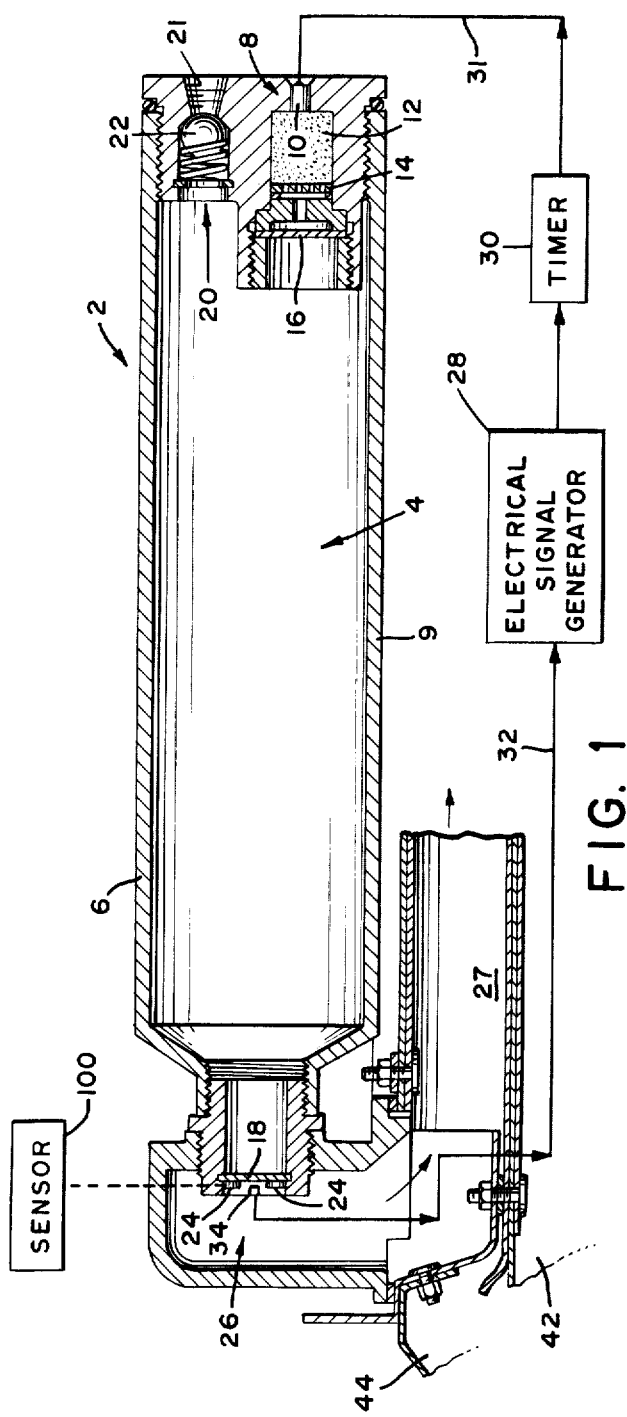
FIG. 1 is a sectional elevational view of an embodiment of a gas filling means of the prior art.

Turning to FIG. 1, an embodiment of the overall assembly illustrating the prior art is generally indicated at 2. The gas filling means 2 in this embodiment comprises a gas containing means (a cylinder) generally indicated at 4 and a gas generating means generally indicated at 8. Both compartments are enclosed in a pressure tank 6. Typical of pressurized tanks, tank 6 preferably is the shape of a cyclinder.

The gas containing means 4 comprises everything within the tank with the exception of the gas generating means 8. This includes the gas inlet means 20. The gas inlet means 20 in a preferred embodiment comprises a tap hole which provides for communication with the source of compressed gas (not shown) via a ball check valve 22. The use of the check valve is preferred in order to insure against any back flow of stored gas. In FIG. 1 the gas inlet means is shown disposed at the upstream end of the tank 6. It should be appreciated that this position of the inlet means 20 is optional and in other embodiments the location of the inlet means 20 may be in other positions on the tank. The outlet of the gas containing means 4 comprises an outlet plug 18. Because of the pressures which are maintained within the gas containing means 4, the tank 6 is provided with thick wall metal casing 9.

The compressed gas contained within the tank is preferably argon or nitrogen. Other gases of the type which are not toxic to humans and do not have a deleterious effect on the gas bag or gas bags shown in this embodiment at 42 and 44, may be substituted for the preferred gases enumerated above.

The gas generating means 8 includes a squib 10. The squib 10 is in communication with an electric impulse means 28 which supplies the spark to ignite the squib 10. The squib 10 is adjacent a source of combustible material, disposed in a combustible chamber 12. The chamber 12, a part of the generating means 8, comprises combustible solid which generates relatively large volumes of gas upon combustion. A composite propellant is employed as the combustible material in the chamber 12. Other materials which are easily burned and which generate large amounts of gas are utilized for the propellant. A slow burning propellant may also be utilized. Also, the configuration of the propellant may be specifically designed to effect the burning characteristic desired. A diffuser 14 is disposed at the downstream end of the combustion chamber 12.

Direction of flow from the gas generating means through the gas container means, or reservoir, and out of the gas container means to the manifold and bag or bags is preferably substantially in a single direction, as shown.

The diffuser 14 provides uniform pressure and velocity of the combustion gas products which move downstream from the chamber 12. The gas generating means 8 also includes a rupture disc 16. The disc 16 separates the gas generating means 8 from the gas containing means 4. The disc 16 is designed to rupture at a specified pressure, or alternatively, for example, an electrical signal by the use of an explosive charge mounted thereto (not shown). The disc 16 may be constructed of any suitable material which will satisfy the design parameters.

In addition to the gas containing means 4 and the gas generating means 8, the apparatus of the instant invention includes an outlet means 26. The outlet means 26 provides a conduit to move the exiting gases from the gas containing means 4 into a manifold 27. The means 26 directs the gases from the gas filling means 2 to the manifold 27 to which a gas bag or bags 42 and 44 are connected.

One method of the prior art embodiment for filling a gas bag comprises employing the cylinder to supply at least substantial gas to the bags and then thereafter for the gas generating means 8 to add generated gas. In the design disclosed, the time of supply of gas into the bag is thus delayed.

The plurality of shape charges 24 are disposed around the periphery of the plug 18. Upon an electrical signal from an impact sensing sensor 28 the shape charges 24 explode, releasing the plug 18 from the tank 6. The signal to initiate the explosive charges 24, in this case, precedes the signal igniting the squib 10. This second signal from the ruptured plug 18 to the squib 10 is delayed by use, for example, of a timer 30 and is transmitted at a time after the initial signal to the plug. FIG. 1 illustrates this method. Upon rupture of the plug 18, a probe 24 is disturbed, creating an electrical impulse transmitted by means of an electrical conduit 31 to an electrical signal generator 28. The generator 28 generates a signal conducted by a second electrical conduit 32. The timer 30, is employed to hold up transmission of the electrical signal to ignite the squib 10 for the required time so that plug dislodgement occurs some time before firing of the squib. The time interval between plug removal and signal generation is selected so that selected emptying of the cylinder may occur before generating gases break the disc 16. This necessary time interval may be calculated by experimental or analytical means.

In one embodiment, as described, the gas generating means is actuated upon an electrical signal transmitted to squib 10 from time 30. The gas generating means 8 provides an excellent actuating means. The electrical signal causes ignition of the squib 10. The squib 10, which comprises a rapid burning powder almost instantaneously ignites the combustible material in the combustion chamber 12. The combustion of combustible material in chamber 12 ignites, resulting in the rapid generation of high pressure, high temperature gas products. Due to the small volume of the chamber 12 pressures build up very rapidly. The gas exerts uniform pressure on the walls of the chamber 12. Three of the four walls are designed to withstand higher pressures than that generated by the gaseous product of the reaction in the chamber 12. However, the fourth wall is provided with the rupture disc 16 which is designed to withstand pressures not in excess of about 3,000 to 5,000 psi, in one embodiment. Pressures in excess of this amount result in the rupturing of the disc 16 with the resultant liberation of the constrained generated gases into the tank 6 of the gas containing means 4.

The tank of the gas containing means 4 is originally filled with an inert gas such as argon, nitrogen or the like to a pressure in the range of about 1,000 to 3,000 pounds per square inch and preferably about 2,000 pounds per square inch. In order to accommodate this initial pressure the tank 6 has a volume in the range of about 50 to 150 cubic inches and preferably 100 cubic inches. The surge of hot gas from the gas generating means 8 after the disc is ruptured may increase the pressure in the tank 6 to a pressure in the range of 3,000 and even as high as 5,000 psi, or higher.

Figure 2:
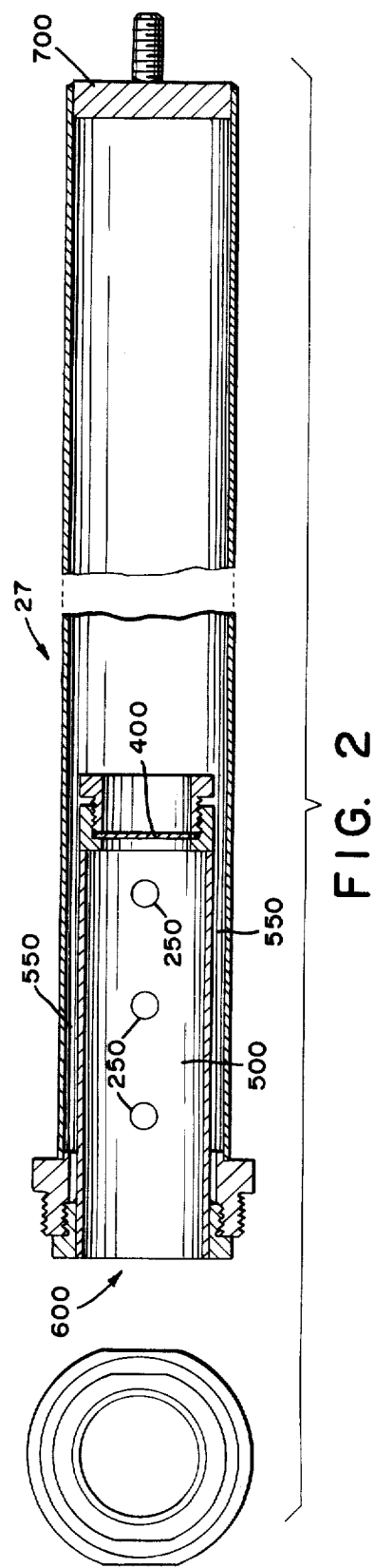
FIG. 2 is a detailed view of the manifold shown in FIG. 1 embodying the invention.

The invention is shown in detail in the manifold 27 shown in FIG. 2. Within the manifold is shown a tube 500. The gas entering the manifold through the end 600 enters the tube and is blocked from an exit therefrom by the burst disc 400 so it exits out of apertures 250, as well as the alternative route means of the smaller flow passage through the outer perimeter 550 of the manifold 27, for movement through the manifold to the end 700 and the gas bags 42 and 44.

Upon build up in gas pressure in the tube 500 located within the manifold, the burst disc 400 ruptures. Then the gas passes through the apertures and directly through the inner tube 500 as well as around the periphery thereof to the end 700 of the manifold and into the gas bags. This results in a greater force of gas delivered to the bag through the manifold and an increase in the speed and force involved in the inflation of the bags, after the breaking of the disc 400.

The preferred thickness range of disc 400 is in the range of about 0.005 inch to 0.0075 inch thickness, with the preferred thickness being about 0.006 inch, and preferably made of stainless steel, for example.

Thus, as long as the disc as barrier is not broken, the inner tube does not provide a conduit for the pressure medium to inflate the bags, and the speed of inflation and the inflating force within the bag is less than it is when the disc breaks and the pressure medium can exit through the entire manifold into the bag at the higher force and pressure on the bag. The two stage passage provided in the flow passage provides for initial reduced inflation characteristics on the bag and the standing child with whom the bag is coming in contact, resulting in a positive advantage in the use of the bag. Furthermore, reduction of flow in the manifold in combination with a delay in flow of gas from gas supply apparatus, as described with relation to FIG. 1 hereof, results in further surge delay and protection for the occupant, particularly the standing child.

It should be appreciated that the above-identified preferred embodiment is illustrative only and that the scope of the instant invention should be limited only by the appended claims.

I claim:

1. A method of delaying inflation of an air bag with an inflating gas supplied from a gas source through a plurality of manifold flow passages comprising the steps of restricting one of the flow passages during the time of initial flow to retard volumetric flow of gas into said bag and increasing gas pressure within said manifold to remove the restriction to flow and permit inflating gas to reach the bag through each of the flow passages a preselected period of time after release of said inflating gas therefrom.

2. A method as claimed in claim 1, wherein gas pressure within said manifold is increased by generating gas within said gas source.

3. Air bag inflation apparatus comprising gas supply means, a gas bag inflated with gas from the supply means, manifold means having a passageway connecting said supply means with said gas bag for supply of inflating gas from said supply means to said bag, a barrier breakable under gas pressure mounted in said manifold blocking a portion of said passageway to retard volumetric flow of gas into said bag, and means for increasing gas pressure within said manifold to break said barrier a preselected period of time after release of inflating gas therefrom.

4. Air bag inflation apparatus of claim 3, wherein said passageway comprises a plurality of conduits, said manifold has an inner surface, said barrier is mounted in a tube disposed in the manifold, and said tube is apertured and has an exterior surface spaced from said inner surface of said manifold to provide one of said conduits.

5. Air bag inflation apparatus of claim 4, said barrier having a thickness of about 0.005 to 0.0075 inch.

6. Air bag inflation apparatus of claim 5, wherein said gas supply means includes pressurized gas containing means and gas generating means, and said means for increasing gas pressure within said manifold includes means for actuating said gas generating means a preselected period of time after release of said pressurized gas.

* * * * *